Patented Apr. 2, 1940

2,195,757

UNITED STATES PATENT OFFICE 2,195,757

GRANULAR, DUSTLESS CALCIUM HYPOCHLORITE PRODUCT

Homer Louis Robson and Gregory A. Petroe, Niagara Falls, N. Y., assignors to The Mathieson Alkali Works, Inc., New York, N. Y., a corporation of Virginia Application October 8, 1938, Serial No. 233,900

6 Claims. (Cl. 23—86)

We have invented a new granular and substantially dustless calcium hypochlorite product of enhanced value as compared to previously known calcium hypochlorite products, because of important advantages in handling and in use.

In conventional practices, calcium hypochlorite is produced in hydrated form in aqueous slurries. The drying and dehydration of calcium hypochlorite so produced and the reduction of the dehydrated material to a product of limited maximum particle size by ordinary methods of drying, dehydration and comminution introduces a high proportion of fines into the final product. This proportion of fines is so high that it renders the production of a final product free from fines by screening this product containing fines economically impossible. The products of ordinary methods of drying, dehydration and comminution usually contain more than about 10% (by weight) of minus 100 mesh material, that is, of material which will pass a 100 mesh screen, and the major proportion of such fines frequently will pass a 300 mesh screen.

Calcium hypochlorite products containing more than about 10% of minus 100 mesh material are characteristically dusty and suffer several disadvantages because of such dustiness. The dustiness itself is objectionable. Further, the presence of such fines retards the penetration of water into masses of the product, thus increasing the time required for solution, involves a tendency to form lumps during solution, and involves a tendency toward packing and caking of the product during shipment and storage.

It has hitherto been proposed to produce granular hypochlorite products, to avoid these recognized difficulties, by two general methods. According to the first of these methods, the chlorination of the aqueous slurry in which the calcium hypochlorite is produced is so controlled that a high proportion of hemibasic calcium hypochlorite is introduced into the product. According to the second of these methods, so-called "binders," serving to cause the fines to adhere to larger particles present, are included in the calcium hypochlorite product. While the products of these methods have reduced the difficulties incident to dustiness, they have in turn suffered characteristic disadvantages.

For example, hemibasic calcium hypochlorite dissolves very slowly in water and frequently will not completely dissolve in solutions of high calcium hypochlorite concentration. Thus, although it is possible, by proper control of the chlorination of the aqueous slurry in which the calcium hypochlorite is produced, to form large crystals of hemibasic calcium hypochlorite, crystals having a length of from 0.1 millimeter to as much as 1 millimeter, to which dust, formed during dehydration from the calcium hypochlorite dihydrate component of the product, tends to adhere, such products suffer the disadvantage of slow or limited solubility characteristic of conventional dusty calcium hypochlorite products, although from another cause.

The "binder" materials commonly included in calcium hypochlorite products comprise calcium chloride and calcium hydroxide. The presence of such "binder" materials in proportions sufficient to eliminate dustiness again introduces other difficulties. In the presence of calcium hypochlorite, calcium chloride forms an aqueous solution at temperatures in excess of 50° C. more retentive of water than calcium hypochlorite dihydrate, thus providing a solution acting as a "binder" to cause dehydrated calcium hypochlorite fines to adhere to the surfaces of larger calcium hypochlorite particles or, if they are present, to larger crystals of hemibasic calcium hypochlorite. However, because of its hygroscopic properties, the presence of more than about 2% or 3% of calcium chloride is objectionable both because it markedly increases the difficulty of eliminating the last few per cent of water during drying of the product and because it increases the tendency of the final calcium hypochlorite product to absorb water during handling and storage. The presence of water lowers the stability of calcium hypochlorite products, and the presence of more than about 2% is particularly undesirable. The presence of calcium hydroxide in proportion much exceeding about 3% is objectionable because of the consequent formation of a voluminous sludge when the product is dissolved in water. The removal of such sludge is itself an added burden and its removal tends to involve losses.

The improved granular calcium hypochlorite product of our invention avoids the difficulties due to dustiness and also avoids those difficulties involved in previous proposals intended to solve this problem. The novel character of the calcium hypochlorite product of our invention is illustrated in the accompanying drawing. In this drawing.

Figure 1:
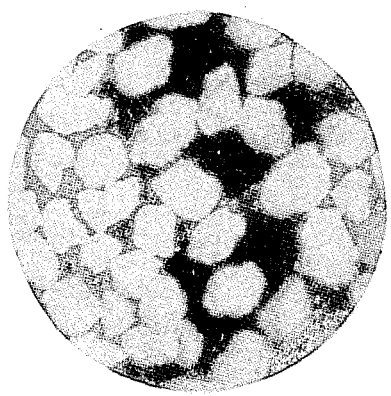
Fig. 1 is a photomicrograph of a calcium hypochlorite product embodying our invention.
Figure 2:
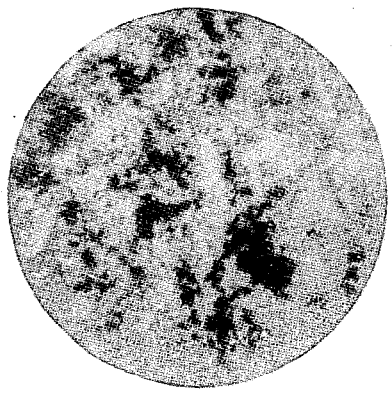
Fig. 2 is a photomicrograph of the calcium hypochlorite product produced by conventional methods of drying and dehydration from a slurry of substantially the same composition as that from which the product illustrated in Fig. 1 was produced.
Figure 3:
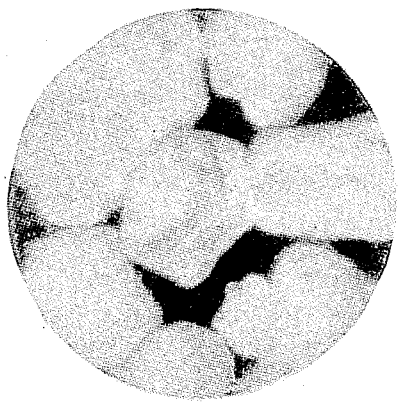
Figure 4:
Figure 5:
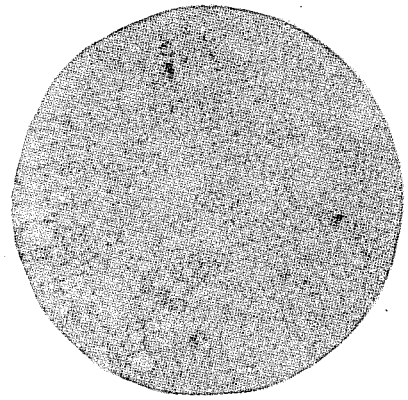

Figs. 3 and 4 are photomicrographs of the material at an intermediate point during production of our new product; and Fig. 5 is a photomicrograph of a conventional calcium hypochlorite product. The magnification of each of these photomicrographs is the same. The calcium hypochlorite product illustrated in Fig. 1 is substantially minus 20 mesh and plus 65 mesh. Comparison of the new product illustrated in Fig. 1 with the conventional product illustrated in Fig. 5 will illustrate the characteristic differences of these products.

We have discovered that aggregates formed from a mass consisting of the solid components of the calcium hypochlorite products and sufficient water, and advantageously sufficient air, to render the mass plastic can be dried to produce granules of sufficient stability to constitute a granular dustless product; that granules so produced can be crushed to limit the maximum particle size of the product without impairing the physical stability of the resulting granules; and that the burden of any screening necessary to eliminate fines, either from the original granulated product or from the crushed granulated product, need not be economically important.

The granular, dustless calcium hypochlorite product of our invention is substantialy free from minus 100 mesh particles. The calcium hydroxide content of the product is, with advantage, limited not to exceed 3%, or better 2%. The calcium chloride content is, with advantage, limited not to exceed 3%, or 2%, or better 1.5%. The water content is, with advantage, limited not to exceed 2%, or better 1%. The product may include an inert diluent or filler such as sodium chloride added, for example, to maintain a uniform calcium hypochlorite content in the product. Sodium chloride, as a diluent or filler, may be included in proportions ranging from about 10% to about 25%. Sodium chloride is not effective as a "binder" and, within the limits stated, calcium hydroxide and calcium chloride are not substantially effective as "binders." Thus, the improved product of our invention, in its preferred form, can properly be described as substantially free from "binders." The improved calcium hypochlorite product of our invention can be prepared, for example, as follows: A mixture consisting of the solid components of the product and sufficient water and air to render the mixture plastic is formed into aggregates, for example, by rolling, molding or extrusion. The plastic mass can be formed, for example, by controlling the water and air content of an existing slurry or by adding water to a dry or partially dry calcium hypochlorite product with appropriate control of the proportion of air present. The proportion of water required varies with different calcium hypochlorite materials, with the proportion of Ca(OCl)$_2$ present and with the proportion of other substances and, particularly, lime present. In general, the proportion of water will approximate not more than one-half the total solids present and not more than two-thirds the calcium hypochlorite present. The proportion of water decreases as the proportion of lime increases. The proportion of entrapped air should approximate 5%-20%. A proportion of entrapped air approximating 15%-20% is particularly advantageous. The proportion of entrapped air in the plastic mass can be reduced by mechanical working. Excessive working is with advantage avoided to maintain a sufficient proportion of entrapped air in the mass. Filtration or dewatering of a slurry to be brought to the plastic condition can usually be so carried out as to incorporate an advantageous proportion of entrapped air. For example, an advantageous proportion of entrapped air may be left in the filter cake and a filtration carried out to adjust the water content of the mass. Again, for example, the finely divided dry calcium hypochlorite product may be added to the mass to increase its air content. Again, such a filter cake may be partially dried, subsequent to filtration, with aeration. The plastic mass to be formed into aggregates may, for example, contain about 15%, by volume, of entrapped air and may analyze as follows:

|  | Per cent by weight |
|---|---|
| Calcium hypochlorite | 50 –53 |
| Calcium chlorate | 0 – 1 |
| Calcium hydroxide | 1 – 2 |
| Calcium carbonate | 0.5– 1.5 |
| Calcium chloride | 0 – 1.5 |
| Sodium chloride | 11 –14 |
| Water | 32 –34 |

To secure equivalent plasticity, the proportion of water should be decreased about 1% for each added 1% of calcium hydroxide. The necessary plasticity may be secured with a proportion of entrapped air approaching zero, but as the proportion of entrapped air diminishes the workable range of water content rapidly narrows. This plastic mass is then formed into aggregates in any convenient manner. It may, for example, and with advantage, be formed into aggregates in the manner described in our co-pending application filed July 20, 1938, Serial Number 220,261. Figures 3 and 4 of the accompanying drawing illustrate aggregates so formed from a plastic mass of this character. The material illustrated in Figure 3 consists of aggregates so formed from a plastic mass containing slightly more than the optimum proportion of water; that illustrated in Fig. 4 consists of aggregates so formed from a plastic mass containing slightly less than the optimum proportion of water but otherwise of corresponding composition. The aggregates so formed are then dried. Crushing during this drying is minimized in order to minimize the production of fines. The compression to which the plastic mass is subjected during formation of the aggregates produces aggregates with a small excess of surface moisture. This surface moisture gives these aggregates, as formed, a tendency to agglomerate. Stored in a manner avoiding agglomeration, such surface moisture becomes redistributed through the aggregates and they lose this tendency, but such storage is economically impossible if large quantities are to be handled. Consequently, these aggregates are, with advantage, subjected to a preliminary drying just sufficient to eliminate this excess surface moisture, for example, by exposing the aggregates to a current of warm air immediately after formation from the plastic mass. This preliminary drying can be avoided, for example, by exposing the aggregates to a stream of air at a temperature of about 60°–75° C. with a relative humidity of about 25% for a period of about 30–60 seconds. This preliminary drying should be effected without materially changing the moisture content of the cores of the aggregates. The drying is then completed, for example, in a rotary vacuum dryer, avoiding substantial crushing during drying. A rotary dryer used for this purpose should contain no lifts, shelves or other projections inside of the shell and no stationary apparatus inside the shell other than the vacuum manifold and its guard. Subject to specific requirements as to maximum particle size, the product of this drying may constitute the product of our invention. Any fines present due, for example, to the use of a proportion of water somewhat less than optimum in the plastic mass from which the aggregates are formed, can be conveniently and economically separated by screening. Similarly, oversized particles can be conveniently and economically separated by screening. This granulated product can also be crushed without excessive production of fines to produce a calcium hypochlorite product embodying our invention, of thus limited maximum particle size. Any fines thus introduced into the product can be conveniently and economically separated by screening and such screening can be combined with any screening used to separate fines incidentally produced during formation of the aggregates. Produced from a plastic mass of the composition previously stated, for example, this calcium hypochlorite product may, for example, analyze as follows:

|  | Per cent by weight |
|---|---|
| Calcium hypochlorite, about | 74 |
| Calcium chlorate | 1.2 |
| Calcium hydroxide | 3 or less |
| Calcium chloride | 2 or less |
| Calcium carbonate | 2 |
| Sodium chloride, about | 17 |
| Water | 1 |

The calcium hypochlorite product should be screened, if necessary, to separate any minus 100 mesh material. Any such fines can be reused in the subsequent production of the plastic mass from which the aggregates are formed. The aggregates constituting the calcium hypochlorite product of our invention, substantially free from minus 100 mesh material, can be screened to produce products meeting a wide range of particle size. The product illustrated in Figure 1 of the accompanying drawing, minus 20 mesh and plus 65 mesh, is economical to produce and meets a wide range of commercial requirements. Products substantially free from minus 100 mesh material, containing substantially less than 10% of minus 100 mesh material and ranging to as much as 20% or more plus 20 mesh, however, embodying our invention, can be produced as described.

We claim:

1. A granular, dustless, calcium hypochlorite product free from a binding agent other than water in an amount sufficient to exert an effective binding action and consisting essentially of calcium hypochlorite, in the form of granules substantially free from minus 100 mesh particles; having such cohesiveness as to resist substantial disintegration and produced by drying aggregates formed from a mass consisting of the solid components of the product and sufficient water and air to render the mass plastic.

2. A granular, dustless, calcium hypochlorite product free from a binding agent other than water in an amount sufficient to exert an effective binding action and consisting essentially of calcium hypochlorite in the form of granules substantially free from minus 100 mesh particles; having such cohesiveness as to resist substantial disintegration and produced by drying, crushing and screening aggregates formed from a mass consisting of the solid components of the product and sufficient water and air to render the mass plastic.

3. A granular, dustless, calcium hypochlorite product free from a binding agent other than water in an amount sufficient to exert an effective binding action and consisting essentially of calcium hypochlorite containing not more than 2% calcium hydroxide, not more than 1.5% calcium chloride and not more than 1% water, in the form of granules substantially free from minus 100 mesh particles; having such cohesiveness as to resist substantial disintegration and produced by drying aggregates formed from a mass consisting of the solid components of the product and sufficient water and air to render the mass plastic.

4. A granular, dustless, calcium hypochlorite product free from a binding agent other than water in an amount sufficient to exert an effective binding action and consisting essentially of calcium hypochlorite containing not more than 3% calcium hydroxide, not more than 3% calcium chloride and not more than 2% water, in the form of granules substantially free from minus 100 mesh particles; having such cohesiveness as to resist substantial disintegration and produced by drying aggregates formed from a mass consisting of the solid components of the product and sufficient water and air to render the mass plastic.

5. A granular, dustless, calcium hypochlorite product free from a binding agent other than water in an amount sufficient to exert an effective binding action and consisting essentially of calcium hypochlorite containing not more than 3% calcium hydroxide, not more than 2% calcium chloride and not more than 1% water, in the form of granules substantially free from minus 100 mesh particles; having such cohesiveness as to resist substantial disintegration and produced by drying aggregates formed from a mass consisting of the solid components of the product and sufficient water and air to render the mass plastic.

6. A granular, dustless, calcium hypochlorite product free from a binding agent other than water in an amount sufficient to exert an effective binding action and consisting essentially of calcium hypochlorite, containing about 10%–25% sodium chloride, not more than 3% calcium hydroxide, not more than 3% calcium chloride and not more than 2% water, in the form of granules substantially free from minus 100 mesh particles; having such cohesiveness as to resist substantial disintegration and produced by drying aggregates formed from a mass consisting of the solid components of the product and sufficient water and air to render the mass plastic.

HOMER LOUIS ROBSON.
GREGORY A. PETROE.